Dec. 9, 1930.   R. T. HOSKING   1,784,142
MATERIAL STRIP FOR SPRING TOOTH LOCK WASHERS
Filed Dec. 15, 1928
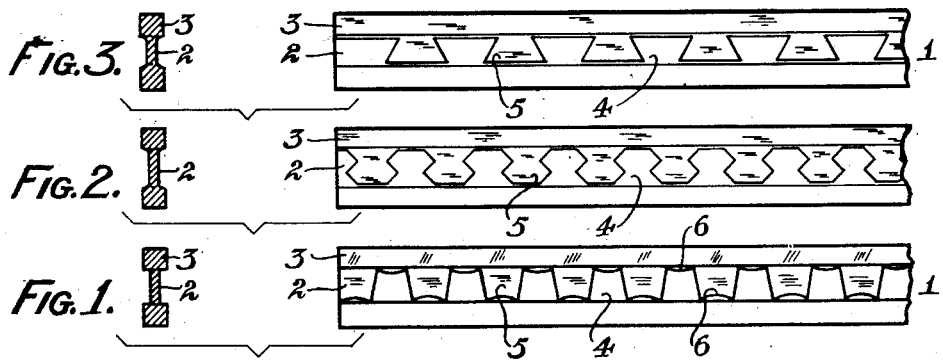
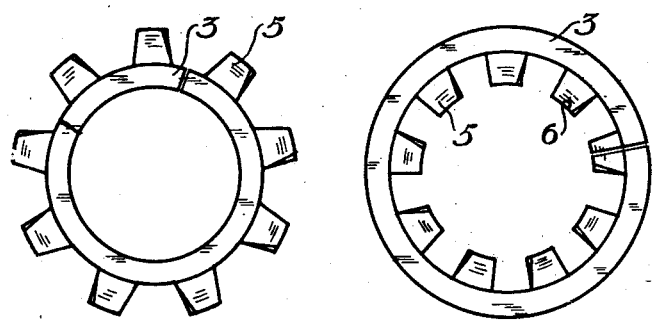
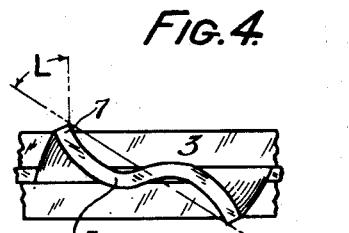   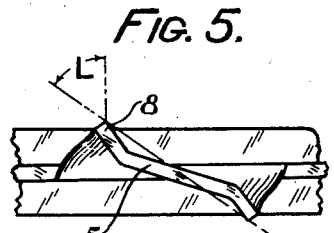
   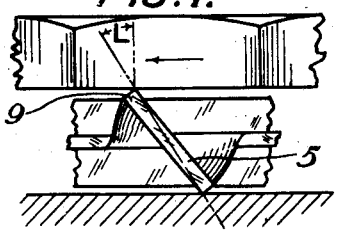
INVENTOR
RICHARD T. HOSKING
BY George B. Willcox
ATTORNEY Patented Dec. 9, 1930

1,784,142

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE

MATERIAL STRIP FOR SPRING-TOOTH LOCK WASHERS

Application filed December 15, 1928. Serial No. 326,347.

This invention relates to the manufacture of lock washers from a base material strip whereby lock washers of the twisted tooth type can be made without waste.

An object of this invention is to provide a stock strip of new cross sectional shape so that washers obtained therefrom will possess teeth whose thickness is less than the thickness of the annular body portion of the washer. As a result, various desirable features of tooth design and tooth proportion, not feasible before, are now available for the purpose of adapting the contour of the teeth, their rolling or warping action and their biting characteristics to the various requirements that have to be met under many different conditions of use. For example, material strips made as herein described and claimed enable washers to be produced whose teeth are only slightly thinner than their bodies for certain uses, or very much thinner for other uses.

When washers are made from plain flat strips of ribbon material their bodies can not be of greater thickness than that determined by the clean-cutting capacity of the tooth-blanking dies. Also they must not be thicker than will insure the production of comparatively sharp corners and edges on the teeth.

No such limits as to thickness of material are imposed in the manufacture of washers from strip material shaped according to my present invention, because the thickness of the teeth is not dependent on the thickness of the washer body.

Other objects are to improve the biting capacity of the spring teeth, and to take better advantage of their normal flexibility for bringing about more effective locking.

A further object is to provide a stock strip so shaped that the washers made from it will be equipped with teeth than can never be completely flattened down, even when the nut to be locked by the washer is screwed down as tightly as possible. The teeth of a washer made from my improved material strip, being thinner than the strip, always stand at a more effective biting angle and consequently exert stronger biting action at the commencement of the locking operation than is possible in a washer whose teeth and body are of the same thickness.

Another object is to provide a material strip that produces washers having teeth possessing unusual strength and durability. This is due to the fact that the grain of the metal extends lengthwise the strip and when it it is bent into annular ring form the direction of the grain in each tooth is crosswise, that is, at right angles to the direction of the tooth from root to point. All teeth of a washer are alike in that respect as distinguished from circular washers that are punched from sheets, whose teeth are more or less cross-grained according to the direction of the grain in the original sheet.

With the foregoing and certain other objects in view, which will appear later in the specification, my invention comprises the devices described and claimed and the equivalents thereof.

In the drawings Figs. 1, 2 and 3 are stock strips showing the way in which the thinned median sections are cut to produce washer teeth of various shapes.

Figs. 6, 7 and 8 are enlarged end views showing various forms of teeth, Fig. 8 showing diagrammatically the relation of a rolling tooth to the nut and to the work.

Fig. 9 is a perspective view of a part of a washer made according to this invention.

As is clearly shown in the drawings, 1 represents a piece of ribbon-metal stock of spring material, for instance, bronze or steel. According to my present invention the medial region 2, along the central longitudinal axis of the strip, is made thinner than the parts 3 near its edges. The central plane of the thin section may coincide with the central plane of the edges 3, as shown in Figs. 1, 2, 3, or it may be to one side thereof if desired. The thin portion 2 is severed lengthwise along an irregular line 4, giving two complemental stock strips each having a serrated edge consisting of leaves or prongs 5. These prongs may be square-ended, but I prefer to form them with concaved ends, as at 6, in order to conform to the correct inner periphery of an internally toothed washer when the strip is bent to circular shape, as shown in Fig. 5.

The prongs 5 of the stock strip are bent or warped in various ways, depending upon the use to which the washers are to be put, constituting biting elements 7, 8, 9 that project out of the planes that define the opposite sides of the relatively thicker edge portion 3.

Figs. 4 and 5 are examples of teeth that lock by scraping action and Fig. 7 shows a tooth that engages by strut-like or rolling tendency, as described in Hosking Patent No. 1,419,564.

A piece of stock strip as herein described, cut to appropriate length and bent to circular form constitutes a spring-toothed lock washer having all of the advantages set forth herein and consists of a thicker rim or body 3 and a plurality of thinner biting teeth 5 projecting radially therefrom, either inwardly as shown in Fig. 5, or outwardly as in Fig. 6.

Having thus described my invention, what I claim and desire to secure by Letters Patent is:

1. A piece of ribbon metal stock of spring material thinner in the region of its central longitudinal axis than near its edges, the thinned portion severed lengthwise along an irregular line, giving two stock strips each having a serrated edge consisting of thinned leaves, portions of said leaves formed to constitute biting elements that project out of the plane of the strip beyond and on opposite sides of the relatively thicker edge portion thereof, a piece of said stock strip adapted when cut to length and bent to circular form to constitute a spring-toothed lock washer.

2. A strip of spring material thinned in the region of its central longitudinal axis, the thinned portion severed lengthwise along an irregular line giving two stock strips each having a serrated edge consisting of locking members thinner than the strip and spaced apart, portions of said locking members formed to constitute biting prongs that project out of the plane of the thicker portion of the strip on opposite sides thereof, the outer ends of said locking members of curved contour, for the purposes set forth.

3. As an article of manufacture, a base material for twisted prong lock washers comprising a strip of ribbon metal formed with a serrated edge constituting regular prongs, said serrated edge thinner than the non-serrated edge, said prongs twisted to provide biting edges that project outside of the plane of the thicker portion of the strip, for the the purposes set forth.

4. A base material for spring tooth lock washers, comprising a strip of spring material one of whose longitudinal edges is thinner than the other and is formed to present a serrated edge consisting of regular teeth twisted and projecting outside the plane of the thicker portion of the strip.

In testimony whereof, I affix my signature.

RICHARD T. HOSKING.